United States Patent
Akhavan et al.

(10) Patent No.: US 6,342,925 B1
(45) Date of Patent: Jan. 29, 2002

(54) AUTOMATIC AUDIO AND VIDEO PARAMETER ADJUSTMENT

(75) Inventors: Mojgan J. Akhavan, Irvine, CA (US); Eugene P. Martinez, Jr., Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/259,157

(22) Filed: Feb. 26, 1999

Related U.S. Application Data

(60) Provisional application No. 60/115,996, filed on Jan. 15, 1999.

(51) Int. Cl.[7] .................. H04N 5/445; H04N 5/50
(52) U.S. Cl. ........................ 348/563; 348/569
(58) Field of Search ................ 348/563, 569, 348/570, 564, 567; H04N 5/445, 5/50

(56) References Cited

U.S. PATENT DOCUMENTS

| | | | |
|---|---|---|---|
| 3,571,499 A | 3/1971 | Hansen et al. | 178/5.4 |
| 3,581,098 A | 5/1971 | Hoover | 250/213 |
| 3,622,696 A | 11/1971 | Macintyre | 178/7.05 DC |
| 4,268,855 A | 5/1981 | Tokahashi | 358/36 |
| 5,241,374 A | 8/1993 | Yang et al. | 358/29 |
| 5,488,434 A | 1/1996 | Jung | 348/725 |
| 5,528,304 A * | 6/1996 | Cherrick | 348/565 |
| 5,579,029 A | 11/1996 | Arai et al. | 345/132 |
| 5,581,305 A | 12/1996 | Min | 348/571 |

* cited by examiner

*Primary Examiner*—Sherrie Hsia
(74) *Attorney, Agent, or Firm*—Marger Johnson & McCollom, PC

(57) ABSTRACT

A method and apparatus for automatic parameter setting adjustment for audio and video appliances. The method determines relevant information for an audio or video program and passes it to a memory. The memory then provides parameter settings associated with the relevant information to a controller, which then adjusts the settings appropriately.

6 Claims, 1 Drawing Sheet

AUTOMATIC AUDIO AND VIDEO PARAMETER ADJUSTMENT

This application claims priority to U.S. Provisional Patent Application Ser. No. 60/115,996, filed Jan. 15, 1999.

BACKGROUND OF THE INVENTION

1. Field of the Invention

This invention relates to consumer audio and video appliances, more particularly to the viewing and/or listening parameters of those appliances.

2. Background of the Invention

Within digital and standard televisions, many audio and video parameter settings exist that when modified, can greatly improve the viewing and listening experience for the user. Examples of these parameters include, but are not limited to, AC-3, sharpness, brightness, and contrast. Currently, when a new program is accessed, either by changing the channel or by the start of a new program, these parameters are not modified. The result is an acceptable, but not optimal viewing and listening experience.

It has been observed that to achieve optimal results, some parameter settings should be modified frequently, perhaps once for every program. There are many properties of broadcast programs that could influence optimal parameter settings. For example, consider the type of program or genre. To achieve optimal results, the sharpness parameter setting for a soap opera might be different than the sharpness parameter setting for a professional sporting event. However, it seems that most viewers very seldom modify the sharpness parameter. Currently, modification of parameter settings requires awkward intervention by the user by traversing through multiple levels of the TV's setup menus.

Even within a given type of program or genre, it is possible that optimal parameter settings could differ significantly. For example, consider two different types of professional sporting events, football and hockey. The optimal parameter settings for a professional sporting event on natural grass in an outdoor stadium probably differs greatly from the optimal parameter settings for a professional sporting event on ice in an indoor arena. Also, consider two different types of movies. The optimal parameter settings for a horror movie probably differ greatly from the optimal parameter settings for a romance movie.

Therefore, a method in which the parameter settings could be determined automatically is needed.

SUMMARY OF THE INVENTION

One embodiment of the invention is a method and apparatus to automatically adjust parameter settings for audio and video appliances used to view video. The method includes the steps of determining the source of the video and a general description of its content and adjusting the parameters to be more appropriate for that particular video. The source of video includes, but is not limited to, cable, terrestrial signals, digital broadcast, satellite, video tape, laser disc, the Internet, and digital video disc. The description of its content can be obtained from the electronic programming guide.

The method includes adjusting parameters based upon the equipment as well. The equipment includes, but is not limited to, standard television sets, digital television sets, set top boxes, video cassette recorders, laser and digital video disc players, stereos with and without surround sound, and computer monitors and speaker systems. Initial settings selected by the viewer will be used as a reference in all adjustments made to the parameter settings. Various reference settings, one for each user, can be saved as a profile.

An apparatus to implement this method is included. The apparatus includes a determination circuit that identifies the source of the video and locates its description, a memory for storing a set of optimal parameter settings associated with different types of video descriptions, and a controller that adjusts the parameters as set out in the memory. Optionally, the memory could also contain parameter settings associated with different brands and types of audio and visual equipment.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
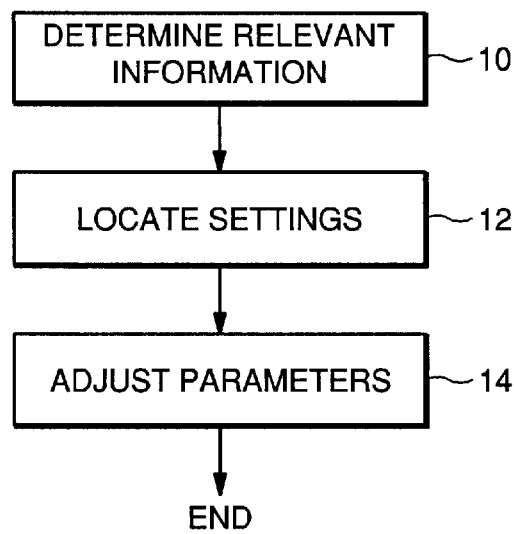
FIG. 1 shows a flow chart of one method in accordance with the invention.

FIG. 1 shows a method of automatic parameter adjustment in accordance with the invention. The information relevant to parameter adjustment is obtained in step 10. The relevant information includes at a minimum the source of the video to be displayed and a general description of its content. The source of the video includes cable, terrestrial television signals, digital television, satellite, videotape, laser disc, digital videodisc (DVD), or the Internet. In some instances, for example, the bandwidth allocation for different channels may be different, making the transmissions of different qualities. The adjustments need to account for this type of situation.

The general description of its content could be obtained from the electronic programming guide, a simultaneously broadcast information channel, or textual description available on the Internet. In the digital television (DTV) environment, the EPG contains a repository of this information. The repository is formatted such that obtaining the program's category, subcategory and audio information is simplified. However, EPGs are available for NTSC and other analog broadcasts. This information can be used as well, although more manipulation of the data to extract the desired information may be necessary.

In the next step of the process, 12, a memory is accessed. The memory contains parameter setting associated with the relevant information. These parameter settings are then used to set the parameters for that particular program. The word program is used to describe whatever the video sequence is to be displayed, whether the video sequence is obtained from broadcast, cable, video tape or the Internet, and does not imply that it is a complete sequence, such as an entire show. The program could be a video clip from the Internet, or a highlight film of a sporting event.

Once the optimal parameter settings are determined, a controller makes the necessary adjustments to those parameters for the program in step 14. Optimal parameters in this sense are those that have been determined to be within a range of parameters determined for the content of the program that increase the quality of the viewing, not those that are truly optimal for the individual user. The user always has the freedom to override the system settings.

As part of the parameter adjustment, the system can take into account any user settings that were determined in the initial set up of the system. The initial settings are typically done when the user turns on the equipment and uses it for the first time, such as the contrast and brightness settings. Alternatively, the initial system settings could be determined from a reference clip of video and audio information provided by the vendor of the system. Using a known sequence allows the system to more clearly set the reference values for user preferences.

These reference settings, whether from initial use or the reference sequence, can be taken into account by the system as it makes adjustments based upon the relevant information. Additionally, the reference settings can be stored for each user, if so desired. These user profiles can be then easily changed when a different user sits down to watch a program. That user can select the appropriate setting in several ways including the remote control or control knobs on the appliance.

In addition to the user settings, equipment-specific parameter settings can be used as well. If the automatic parameter controls or apparatus were built into the appliance, the optimal equipment-specific settings would be set at the factory. However, if the automatic parameter control is in a peripheral device, such as a set-top box or VCR, the type of equipment used for display and sound will affect the optimal parameter settings.

The equipment-specific parameters would be determined in a similar way to the user parameters, with the user providing the information about the equipment to the device. The device would then acquire the necessary information from the memory for that equipment and use it in determining the optimal settings.

Any or all of these settings may vary over time and circumstance. For example, the user settings for brightness may change if the television or audio-video appliance is moved to a different position or a different room because of changes in the lighting. A rise in the ambient noise level in the viewing room may cause a user to adjust their settings. Additionally, the equipment profiles used as startup may change as the equipment burns in, which could be compensated in the user profile. This may be done manually, or semi-automatically or automatically, with some type of agent technology.

Figure 2:
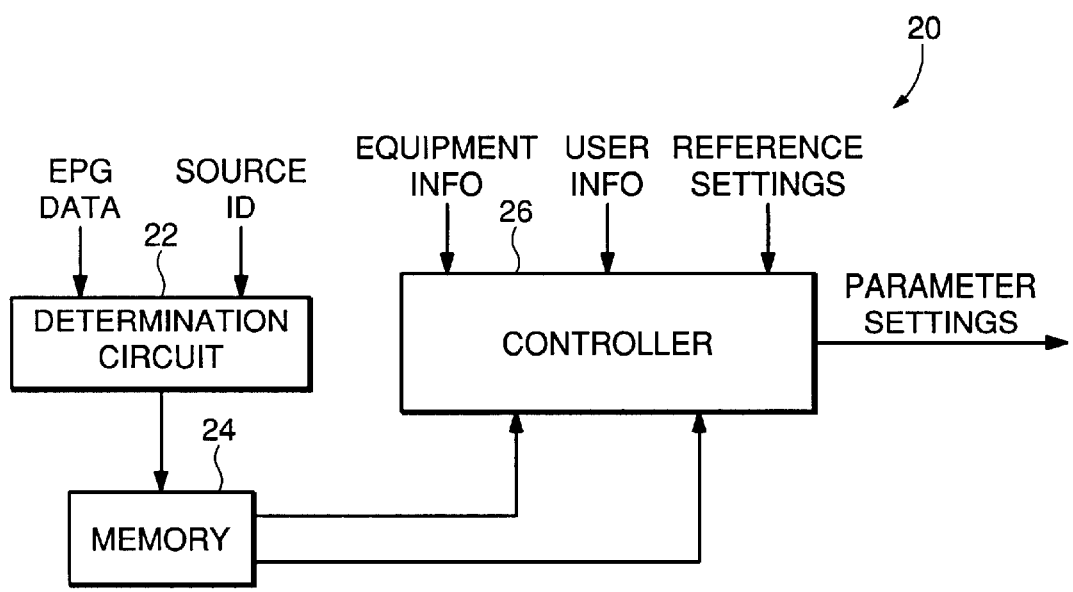
FIG. 2 shows one embodiment of an apparatus in accordance with the invention.

A block diagram of an apparatus in accordance with the invention is shown in FIG. 2. The apparatus 20 is shown as having three distinct parts, but could all be implemented in one processor or other device. The determination circuit 22 could include a parser or other analysis software that locates the information from the electronic program guide (EPG). The EPG is normally of a set format, such as PSIP, that has identifying fields for the content of any program. The determination circuit could also detect the input signals set by the user to determine the source of the video. For example, if the user selects the VCR, the determination circuit will then adjust for the source to be videotape.

The determination circuit then passes this information to the memory 24, which is some sort of associative memory with a list of parameters associated with each type of program and source. The memory then provides the optimal settings for that program. Additionally, the memory could also store the user profiles and equipment information. One example of such a memory is a look-up table (LUT)

The controller 26 then takes the information from the memory and uses it to set the parameters to the appropriate settings. Additionally, the controller can also use the initial user information, whether stored as a profile or not, and the equipment information, which may come from the memory or the user. The controller then determines the setting that is appropriate for all of these inputs and set the parameter accordingly.

One example of such a setting determination is shown below. The ranges of optimal settings for the user, the equipment, the source and the program are used to narrow down the value for the appropriate setting. In this example, the discussion will assume a contrast setting that varies along a scale of 0 to 10.

| Input | Range for Contrast (0–10) |
|---|---|
| User | 6–9 |
| Equipment | 5–8 |
| Source | 6–10 |
| Program | 4–8 |

In this case the controller will select 6, 7 or 8. The selection of the mid-point of the allowable range, the low or high points could be determined in advance by the system designer and programmed into the controller. Additionally, if some of the ranges do not overlap in such a way that a value is within all the ranges, the priority of the various inputs could be used to remove one of the inputs from the determination.

Alternative arrangements for the reception and storage of the information are of course available. The determination circuit could be the one point where all the information is received, or the controller could receive all the information and merely task the determination circuit when necessary. The user profiles and equipment information could be stored in the memory, or they could be stored in a second memory in the controller. The embodiment of FIG. 2 is only intended as an example.

This invention will enhance the user's listening and viewing experience by automatically adjusting the audio and video parameter settings to their optimal values based upon the category of the desired program, the delivery system, the frequency response of the system, materials construction, resolution, and type of equipment. The system will also take into account personal preferences for one or more users. Changes in any of these categories will be detected and compensated for automatically.

Several levels of this type of system could be made available to purchasers. Less expensive sets would take into account a lower number of variables that would affect parameter adjustment. More expensive sets would take into account more variables or may offer a higher number of programmable user profiles.

Thus, although there has been described to this point a particular embodiment for a method and structure for automatic parameter adjustment in audio and visual appliances, it is not intended that such specific references be considered as limitations upon the scope of this invention except in-so-far as set forth in the following claims.

What is claimed is:

1. A method of automatic parameter setting adjustment for audio and video appliances, comprising the steps of:
   a) determining relevant information about a program to be displayed;
   b) using said relevant information to locate associated parameter settings for said relevant information;

c) providing said associated parameter settings to a controller; and d) adjusting parameters to said associated parameter settings.

2. The method of claim 1 wherein said relevant information includes a delivery system for said program.

3. The method of claim 1 wherein said relevant information includes a category for said program.

4. The method of claim 1 wherein said relevant information includes equipment settings for said program.

5. The method of claim 1 wherein said method further comprises the step of taking into account user preferences.

6. An apparatus for automatic parameter settings for an audio and video appliance, comprising:

a) a determination circuit operable to determine relevant information about a program to be displayed;

b) a memory operable to receive said relevant information and to provide parameter settings based upon said relevant information; and c) a controller to receive said parameter settings from said memory and to adjust parameters to those parameter settings for said appliance.

* * * * *